(12) United States Patent
Rogers et al.

(10) Patent No.: US 10,544,656 B2
(45) Date of Patent: Jan. 28, 2020

(54) ACTIVE FLUID CONTAINMENT FOR MUD TANKS

(71) Applicant: Schlumberger Technology Corporation, Houston, TX (US)

(72) Inventors: Brian Rogers, Houston, TX (US); Jacques Orban, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 14/983,181

(22) Filed: Dec. 29, 2015

(65) Prior Publication Data

US 2016/0290105 A1   Oct. 6, 2016

Related U.S. Application Data

(60) Provisional application No. 62/141,581, filed on Apr. 1, 2015.

(51) Int. Cl.
  *E21B 41/00* (2006.01)
  *G05D 9/12* (2006.01)

(52) U.S. Cl.
  CPC .......... *E21B 41/00* (2013.01); *G05D 9/12* (2013.01); *Y10T 137/5762* (2015.04)

(58) Field of Classification Search
  CPC ........ E21B 41/00; E21B 21/01; E21B 21/015; G05D 9/12
  See application file for complete search history.

(56) References Cited

U.S. PATENT DOCUMENTS

| | | | |
|---|---|---|---|
| 5,062,280 A * | 11/1991 | Martin, Sr. | F24F 3/044 165/126 |
| 5,228,506 A * | 7/1993 | Pearce | E21B 33/08 166/81.1 |
| 6,273,021 B1 * | 8/2001 | Pembroke | B65D 90/24 116/228 |
| 6,527,062 B2 | 3/2003 | Elkins et al. | |
| 6,607,659 B2 * | 8/2003 | Hensley | E21B 21/065 175/206 |
| 6,615,925 B2 * | 9/2003 | Rice | E21B 27/00 166/369 |
| 6,925,392 B2 | 8/2005 | McNeil, III et al. | |
| 7,044,239 B2 | 5/2006 | Pinckard et al. | |

(Continued)

FOREIGN PATENT DOCUMENTS

| | | |
|---|---|---|
| CN | 104373066 A | 2/2015 |
| WO | 2007045921 A1 | 4/2007 |
| WO | 2016167747 A1 | 10/2016 |

OTHER PUBLICATIONS

International Preliminary Report on Patentability issued in International Patent Application No. PCT/US2016/024951 dated Oct. 12, 2017; 11 pages.

*Primary Examiner* — Craig M Schneider
*Assistant Examiner* — Kevin R Barss
(74) *Attorney, Agent, or Firm* — Rachel E. Greene

(57) ABSTRACT

Apparatus, method, and a containment system for a mud tank The system includes a pan extending from a base of the mud tank and configured to receive fluids leaked therefrom, a fluid sensor coupled with the pan, and a pump in fluid communication with the pan, wherein the pump is configured to remove fluid from the pan when the fluid sensor reads a predetermined threshold fluid level in the pan.

5 Claims, 5 Drawing Sheets

(56) References Cited

U.S. PATENT DOCUMENTS

| | | | |
|---|---|---|---|
| 7,476,318 B1 | 1/2009 | Tibban | |
| 7,540,838 B2* | 6/2009 | Scott | E21B 21/062 494/10 |
| 7,730,967 B2 | 6/2010 | Ballantyne et al. | |
| 7,823,656 B1 | 11/2010 | Williams | |
| 7,921,937 B2 | 4/2011 | Brackin et al. | |
| 7,980,326 B2 | 7/2011 | Tibbitts et al. | |
| 8,027,571 B2* | 9/2011 | Vinegar | C07C 4/02 166/302 |
| 8,201,628 B2 | 6/2012 | Lovorn et al. | |
| 8,261,826 B2 | 9/2012 | Lovorn et al. | |
| 8,281,875 B2 | 10/2012 | Lovorn et al. | |
| 8,347,957 B2 | 1/2013 | Stephenson et al. | |
| 8,397,836 B2 | 3/2013 | Pool et al. | |
| 8,404,297 B2 | 3/2013 | Arango Moreno | |
| 8,812,236 B1 | 8/2014 | Freeman et al. | |
| 8,833,488 B2 | 9/2014 | Knudsen et al. | |
| 8,899,348 B2 | 12/2014 | Henderson et al. | |
| 8,905,157 B2 | 12/2014 | Jiao et al. | |
| 9,080,407 B2 | 7/2015 | Bernard | |
| 9,169,700 B2 | 10/2015 | Curtis et al. | |
| 9,249,638 B2 | 2/2016 | Bernard | |
| 2007/0289617 A1* | 12/2007 | Lofton | B08B 9/0321 134/166 R |
| 2009/0260430 A1* | 10/2009 | Zamfes | E21B 21/08 73/152.04 |
| 2012/0275927 A1 | 11/2012 | Rhim | |
| 2013/0269735 A1* | 10/2013 | Roetzel | E21B 21/062 134/40 |
| 2014/0014214 A1* | 1/2014 | Eia | E21B 21/06 137/899.2 |
| 2014/0116964 A1* | 5/2014 | Bevan | E21B 21/065 210/780 |
| 2014/0227035 A1* | 8/2014 | Johnson | E21B 43/00 405/50 |
| 2014/0238499 A1 | 8/2014 | Antoun | |
| 2014/0262315 A1* | 9/2014 | Boisjolie | E21B 17/01 166/367 |
| 2014/0299377 A1 | 10/2014 | Abbassian et al. | |
| 2016/0202709 A1* | 7/2016 | Newman, Jr. | G05D 9/12 137/2 |
| 2017/0226813 A1 | 8/2017 | Northam et al. | |

* cited by examiner

ACTIVE FLUID CONTAINMENT FOR MUD TANKS

CROSS-REFERENCE TO RELATED APPLICATIONS

This application claims priority to U.S. Provisional Patent Application having Ser. No. 62/141,581, which was filed Apr. 1, 2015 and is incorporated by reference herein in its entirety.

BACKGROUND

On oil and gas rigs, containment of fluids may be an environmental issue. Fluids may leak or spill from various sources, such as pipe or hose connections with the mud tank. The rig may thus provide a kickboard, which may have sides, allowing the kickboard to collect the fluids that might otherwise fall to the ground. Periodically, a rig worker uses a vacuum pump to evacuate fluid from this kickboard.

SUMMARY

Embodiments of the disclosure may provide a containment system for a mud tank The system includes a pan extending from a base of the mud tank and configured to receive fluids leaked therefrom, a fluid sensor coupled with the pan, and a pump in fluid communication with the pan, wherein the pump is configured to remove fluid from the pan when the fluid sensor reads a predetermined threshold fluid level in the pan.

Embodiments of the disclosure may also provide an apparatus including a mud tank for containing a fluid to be deployed into a wellbore. The mud tank includes a base and an upper portion. The apparatus also includes a pan extending from the mud tank, proximal to the base, such that the upper portion shields the pan, a fluid sensor coupled with the pan, and a pump in fluid communication with the pan. The pump is configured to remove fluid from the pan when the fluid sensor indicates a predetermined threshold fluid level.

Embodiments of the disclosure may further provide a method for fluid containment of a mud tank The method includes catching fluid leaked from the mud tank or a connection therewith in a pan extending from a base of the mud tank, determining, using a fluid sensor coupled with the pan, that a fluid level in the pan is at least at a predetermined threshold level; and in response to determining that the fluid level in the pan is at least at the predetermined threshold level, pumping the fluid from the pan.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to specific embodiments illustrated in the accompanying drawings and figures. In the following detailed description, numerous specific details are set forth in order to provide a thorough understanding of the invention. However, it will be apparent to one of ordinary skill in the art that embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object or step, and, similarly, a second object could be termed a first object or step, without departing from the scope of the present disclosure.

The terminology used in the description of the invention herein is for the purpose of describing particular embodiments only and is not intended to be limiting. As used in the description of the invention and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Figure 1:
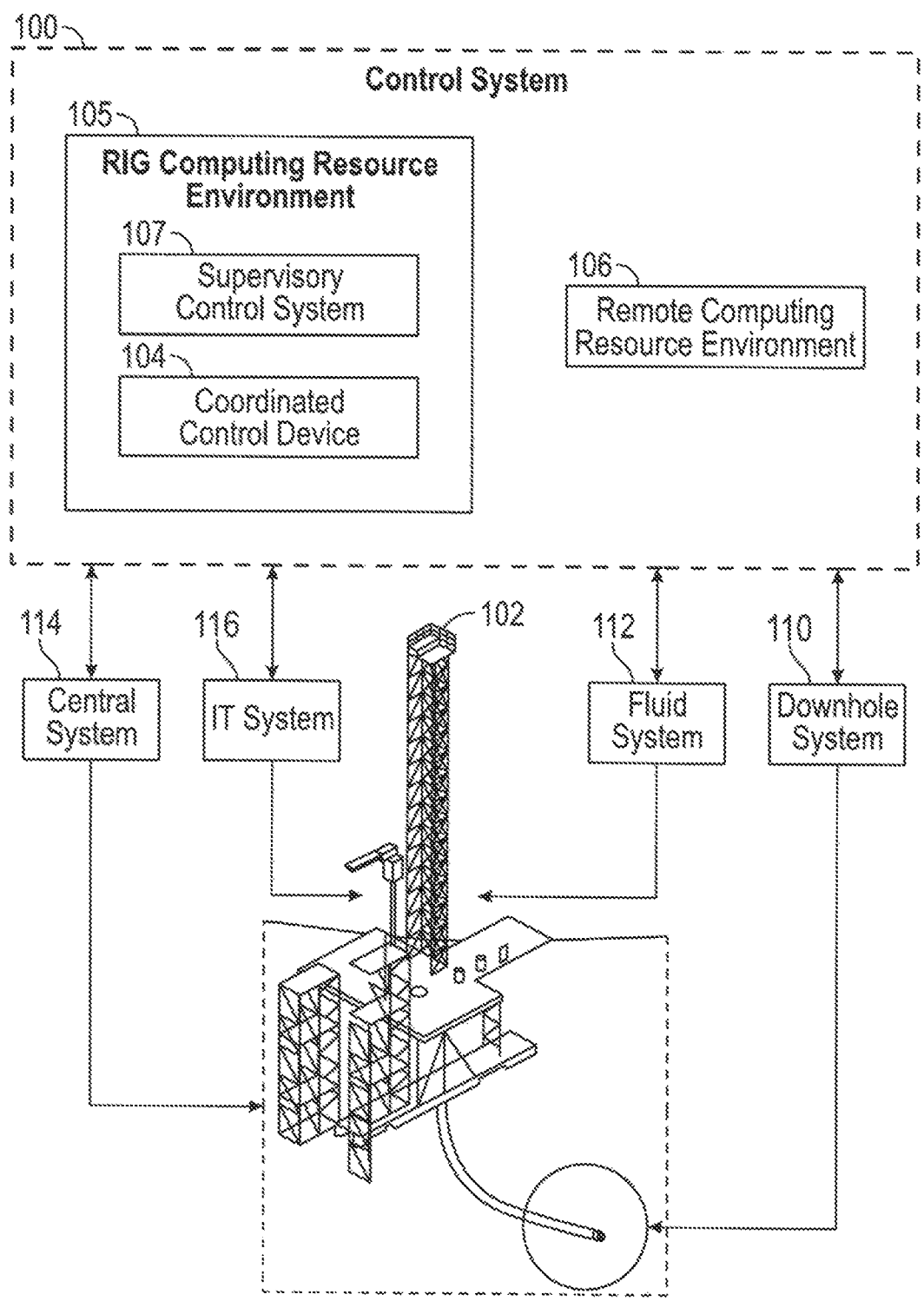
FIG. 1 illustrates a schematic view of a drilling rig and a control system, according to an embodiment.

FIG. 1 illustrates a conceptual, schematic view of a control system 100 for a drilling rig 102, according to an embodiment. The control system 100 may include a rig computing resource environment 105, which may be located onsite at the drilling rig 102 and, in some embodiments, may have a coordinated control device 104. The control system 100 may also provide a supervisory control system 107. In some embodiments, the control system 100 may include a remote computing resource environment 106, which may be located offsite from the drilling rig 102.

The remote computing resource environment 106 may include computing resources locating offsite from the drilling rig 102 and accessible over a network. A "cloud" computing environment is one example of a remote computing resource. The cloud computing environment may communicate with the rig computing resource environment 105 via a network connection (e.g., a WAN or LAN connection). In some embodiments, the remote computing resource environment 106 may be at least partially located onsite, e.g., allowing control of various aspects of the drilling rig 102 onsite through the remote computing resource environment 105 (e.g., via mobile devices).

Accordingly, "remote" should not be limited to any particular distance away from the drilling rig 102.

Further, the drilling rig 102 may include various systems with different sensors and equipment for performing operations of the drilling rig 102, and may be monitored and controlled via the control system 100, e.g., the rig computing resource environment 105. Additionally, the rig computing resource environment 105 may provide for secured access to rig data to facilitate onsite and offsite user devices monitoring the rig, sending control processes to the rig, and the like.

Various example systems of the drilling rig 102 are depicted in FIG. 1. For example, the drilling rig 102 may include a downhole system 110, a fluid system 112, and a central system 114. These systems 110, 112, 114 may also be examples of "subsystems" of the drilling rig 102, as described herein. In some embodiments, the drilling rig 102 may include an information technology (IT) system 116. The downhole system 110 may include, for example, a bottom-hole assembly (BHA), mud motors, sensors, etc. disposed along the drill string, and/or other drilling equipment configured to be deployed into the wellbore. Accordingly, the downhole system 110 may refer to tools disposed in the wellbore, e.g., as part of the drill string used to drill the well.

The fluid system 112 may include, for example, drilling mud, pumps, valves, cement, mud-loading equipment, mud-management equipment, pressure-management equipment, separators, and other fluids equipment. Accordingly, the fluid system 112 may perform fluid operations of the drilling rig 102.

The central system 114 may include a hoisting and rotating platform, top drives, rotary tables, kellys, drawworks, pumps, generators, tubular handling equipment, derricks, masts, substructures, and other suitable equipment. Accordingly, the central system 114 may perform power generation, hoisting, and rotating operations of the drilling rig 102, and serve as a support platform for drilling equipment and staging ground for rig operation, such as connection make up, etc. The IT system 116 may include software, computers, and other IT equipment for implementing IT operations of the drilling rig 102.

The control system 100, e.g., via the coordinated control device 104 of the rig computing resource environment 105, may monitor sensors from multiple systems of the drilling rig 102 and provide control commands to multiple systems of the drilling rig 102, such that sensor data from multiple systems may be used to provide control commands to the different systems of the drilling rig 102. For example, the system 100 may collect temporally and depth aligned surface data and downhole data from the drilling rig 102 and store the collected data for access onsite at the drilling rig 102 or offsite via the rig computing resource environment 105. Thus, the system 100 may provide monitoring capability. Additionally, the control system 100 may include supervisory control via the supervisory control system 107.

In some embodiments, one or more of the downhole system 110, fluid system 112, and/or central system 114 may be manufactured and/or operated by different vendors. In such an embodiment, certain systems may not be capable of unified control (e.g., due to different protocols, restrictions on control permissions, safety concerns for different control systems, etc.). An embodiment of the control system 100 that is unified, may, however, provide control over the drilling rig 102 and its related systems (e.g., the downhole system 110, fluid system 112, and/or central system 114, etc.). Further, the downhole system 110 may include one or a plurality of downhole systems. Likewise, fluid system 112, and central system 114 may contain one or a plurality of fluid systems and central systems, respectively.

In addition, the coordinated control device 104 may interact with the user device(s) (e.g., human-machine interface(s)) 118, 120. For example, the coordinated control device 104 may receive commands from the user devices 118, 120 and may execute the commands using two or more of the rig systems 110, 112, 114, e.g., such that the operation of the two or more rig systems 110, 112, 114 act in concert and/or off-design conditions in the rig systems 110, 112, 114 may be avoided.

Figure 2:
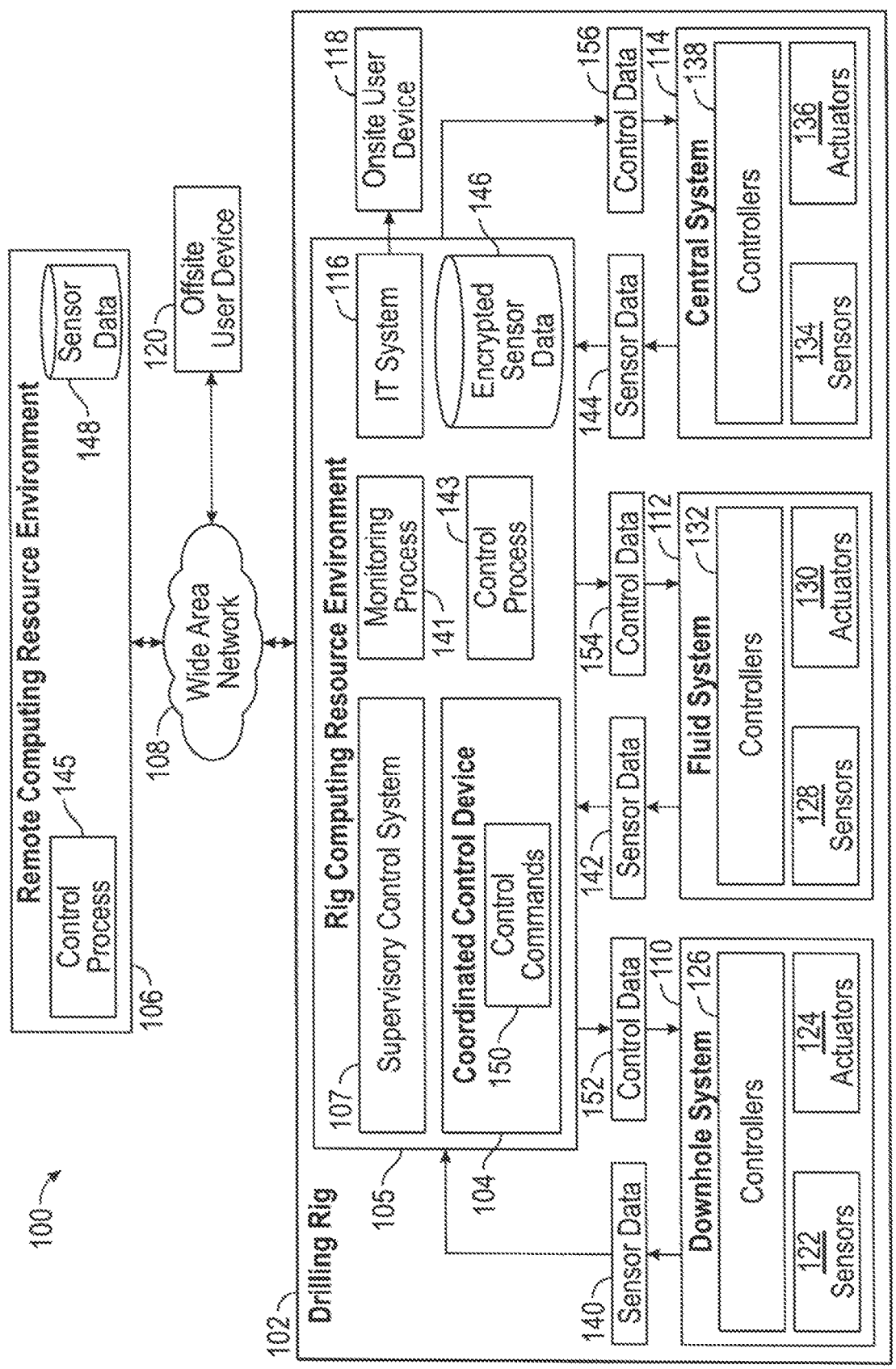
FIG. 2 illustrates a schematic view of a drilling rig and a remote computing resource environment, according to an embodiment.

FIG. 2 illustrates a conceptual, schematic view of the control system 100, according to an embodiment. The rig computing resource environment 105 may communicate with offsite devices and systems using a network 108 (e.g., a wide area network (WAN) such as the internet). Further, the rig computing resource environment 105 may communicate with the remote computing resource environment 106 via the network 108. FIG. 2 also depicts the aforementioned example systems of the drilling rig 102, such as the downhole system 110, the fluid system 112, the central system 114, and the IT system 116. In some embodiments, one or more onsite user devices 118 may also be included on the drilling rig 102. The onsite user devices 118 may interact with the IT system 116. The onsite user devices 118 may include any number of user devices, for example, stationary user devices intended to be stationed at the drilling rig 102 and/or portable user devices. In some embodiments, the onsite user devices 118 may include a desktop, a laptop, a smartphone, a personal data assistant (PDA), a tablet component, a wearable computer, or other suitable devices. In some embodiments, the onsite user devices 118 may communicate with the rig computing resource environment 105 of the drilling rig 102, the remote computing resource environment 106, or both.

One or more offsite user devices 120 may also be included in the system 100. The offsite user devices 120 may include a desktop, a laptop, a smartphone, a personal data assistant (PDA), a tablet component, a wearable computer, or other suitable devices. The offsite user devices 120 may be configured to receive and/or transmit information (e.g., monitoring functionality) from and/or to the drilling rig 102 via communication with the rig computing resource environment 105. In some embodiments, the offsite user devices 120 may provide control processes for controlling operation of the various systems of the drilling rig 102. In some embodiments, the offsite user devices 120 may communicate with the remote computing resource environment 106 via the network 108.

The user devices 118 and/or 120 may be examples of a human-machine interface. These devices 118, 120 may allow feedback from the various rig subsystems to be displayed and allow commands to be entered by the user. In various embodiments, such human-machine interfaces may be onsite or offsite, or both.

The systems of the drilling rig 102 may include various sensors, actuators, and controllers (e.g., programmable logic controllers (PLCs)), which may provide feedback for use in the rig computing resource environment 105. For example, the downhole system 110 may include sensors 122, actuators 124, and controllers 126. The fluid system 112 may include sensors 128, actuators 130, and controllers 132. Additionally, the central system 114 may include sensors 134, actuators 136, and controllers 138. The sensors 122, 128, and 134 may include any suitable sensors for operation of the drilling rig 102. In some embodiments, the sensors 122, 128, and 134 may include a camera, a pressure sensor, a temperature sensor, a flow rate sensor, a vibration sensor, a current sensor, a voltage sensor, a resistance sensor, a gesture detection sensor or device, a voice actuated or recognition device or sensor, or other suitable sensors.

The sensors described above may provide sensor data feedback to the rig computing resource environment 105 (e.g., to the coordinated control device 104). For example, downhole system sensors 122 may provide sensor data 140, the fluid system sensors 128 may provide sensor data 142, and the central system sensors 134 may provide sensor data 144. The sensor data 140, 142, and 144 may include, for example, equipment operation status (e.g., on or off, up or down, set or release, etc.), drilling parameters (e.g., depth, hook load, torque, etc.), auxiliary parameters (e.g., vibration data of a pump) and other suitable data. In some embodiments, the acquired sensor data may include or be associated with a timestamp (e.g., a date, time or both) indicating when the sensor data was acquired. Further, the sensor data may be aligned with a depth or other drilling parameter.

Acquiring the sensor data into the coordinated control device 104 may facilitate measurement of the same physical properties at different locations of the drilling rig 102. In some embodiments, measurement of the same physical properties may be used for measurement redundancy to enable continued operation of the well. In yet another embodiment, measurements of the same physical properties at different locations may be used for detecting equipment conditions among different physical locations. In yet another embodiment, measurements of the same physical properties using different sensors may provide information about the relative quality of each measurement, resulting in a "higher" quality measurement being used for rig control, and process applications. The variation in measurements at different locations over time may be used to determine equipment performance, system performance, scheduled maintenance due dates, and the like. Furthermore, aggregating sensor data from each subsystem into a centralized environment may enhance drilling process and efficiency. For example, slip status (e.g., in or out) may be acquired from the sensors and provided to the rig computing resource environment 105, which may be used to define a rig state for automated control. In another example, acquisition of fluid samples may be measured by a sensor and related with bit depth and time measured by other sensors. Acquisition of data from a camera sensor may facilitate detection of arrival and/or installation of materials or equipment in the drilling rig 102. The time of arrival and/or installation of materials or equipment may be used to evaluate degradation of a material, scheduled maintenance of equipment, and other evaluations.

The coordinated control device 104 may facilitate control of individual systems (e.g., the central system 114, the downhole system, or fluid system 112, etc.) at the level of each individual system. For example, in the fluid system 112, sensor data 128 may be fed into the controller 132, which may respond to control the actuators 130. However, for control operations that involve multiple systems, the control may be coordinated through the coordinated control device 104. Examples of such coordinated control operations include the control of downhole pressure during tripping. The downhole pressure may be affected by both the fluid system 112 (e.g., pump rate and choke position) and the central system 114 (e.g. tripping speed). When it is desired to maintain certain downhole pressure during tripping, the coordinated control device 104 may be used to direct the appropriate control commands. Furthermore, for mode based controllers which employ complex computation to reach a control setpoint, which are typically not implemented in the subsystem PLC controllers due to complexity and high computing power demands, the coordinated control device 104 may provide the adequate computing environment for implementing these controllers.

In some embodiments, control of the various systems of the drilling rig 102 may be provided via a multi-tier (e.g., three-tier) control system that includes a first tier of the controllers 126, 132, and 138, a second tier of the coordinated control device 104, and a third tier of the supervisory control system 107. The first tier of the controllers may be responsible for safety critical control operation, or fast loop feedback control. The second tier of the controllers may be responsible for coordinated controls of multiple equipment or subsystems, and/or responsible for complex model based controllers. The third tier of the controllers may be responsible for high level task planning, such as to command the rig system to maintain certain bottom hole pressure. In other embodiments, coordinated control may be provided by one or more controllers of one or more of the drilling rig systems 110, 112, and 114 without the use of a coordinated control device 104. In such embodiments, the rig computing resource environment 105 may provide control processes directly to these controllers for coordinated control. For example, in some embodiments, the controllers 126 and the controllers 132 may be used for coordinated control of multiple systems of the drilling rig 102.

The sensor data 140, 142, and 144 may be received by the coordinated control device 104 and used for control of the drilling rig 102 and the drilling rig systems 110, 112, and 114. In some embodiments, the sensor data 140, 142, and 144 may be encrypted to produce encrypted sensor data 146. For example, in some embodiments, the rig computing resource environment 105 may encrypt sensor data from different types of sensors and systems to produce a set of encrypted sensor data 146. Thus, the encrypted sensor data 146 may not be viewable by unauthorized user devices (either offsite or onsite user device) if such devices gain access to one or more networks of the drilling rig 102. The sensor data 140, 142, 144 may include a timestamp and an aligned drilling parameter (e.g., depth) as discussed above. The encrypted sensor data 146 may be sent to the remote computing resource environment 106 via the network 108 and stored as encrypted sensor data 148.

The rig computing resource environment 105 may provide the encrypted sensor data 148 available for viewing and processing offsite, such as via offsite user devices 120. Access to the encrypted sensor data 148 may be restricted via access control implemented in the rig computing resource environment 105. In some embodiments, the encrypted sensor data 148 may be provided in real-time to offsite user devices 120 such that offsite personnel may view real-time status of the drilling rig 102 and provide feedback based on the real-time sensor data. For example, different portions of the encrypted sensor data 146 may be sent to offsite user devices 120. In some embodiments, encrypted sensor data may be decrypted by the rig computing resource environment 105 before transmission or decrypted on an offsite user device after encrypted sensor data is received.

The offsite user device 120 may include a client (e.g., a thin client) configured to display data received from the rig computing resource environment 105 and/or the remote computing resource environment 106. For example, multiple types of thin clients (e.g., devices with display capability and minimal processing capability) may be used for certain functions or for viewing various sensor data.

The rig computing resource environment 105 may include various computing resources used for monitoring and controlling operations such as one or more computers having a processor and a memory. For example, the coordinated control device 104 may include a computer having a processor and memory for processing sensor data, storing sensor data, and issuing control commands responsive to sensor data. As noted above, the coordinated control device 104 may control various operations of the various systems of the drilling rig 102 via analysis of sensor data from one or more drilling rig systems (e.g. 110, 112, 114) to enable coordinated control between each system of the drilling rig 102. The coordinated control device 104 may execute control commands 150 for control of the various systems of the drilling rig 102 (e.g., drilling rig systems 110, 112, 114). The coordinated control device 104 may send control data determined by the execution of the control commands 150 to one or more systems of the drilling rig 102. For example, control data 152 may be sent to the downhole system 110, control data 154 may be sent to the fluid system 112, and control data 154 may be sent to the central system 114. The control data may include, for example, operator commands (e.g., turn on or off a pump, switch on or off a valve, update a physical property setpoint, etc.). In some embodiments, the coordinated control device 104 may include a fast control loop that directly obtains sensor data 140, 142, and 144 and executes, for example, a control algorithm. In some embodiments, the coordinated control device 104 may include a slow control loop that obtains data via the rig computing resource environment 105 to generate control commands.

In some embodiments, the coordinated control device 104 may intermediate between the supervisory control system 107 and the controllers 126, 132, and 138 of the systems 110, 112, and 114. For example, in such embodiments, a supervisory control system 107 may be used to control systems of the drilling rig 102. The supervisory control system 107 may include, for example, devices for entering control commands to perform operations of systems of the drilling rig 102. In some embodiments, the coordinated control device 104 may receive commands from the supervisory control system 107, process the commands according to a rule (e.g., an algorithm based upon the laws of physics for drilling operations), and/or control processes received from the rig computing resource environment 105, and provides control data to one or more systems of the drilling rig 102. In some embodiments, the supervisory control system 107 may be provided by and/or controlled by a third party. In such embodiments, the coordinated control device 104 may coordinate control between discrete supervisory control systems and the systems 110, 112, and 114 while using control commands that may be optimized from the sensor data received from the systems 110 112, and 114 and analyzed via the rig computing resource environment 105.

The rig computing resource environment 105 may include a monitoring process 141 that may use sensor data to determine information about the drilling rig 102. For example, in some embodiments the monitoring process 141 may determine a drilling state, equipment health, system health, a maintenance schedule, or any combination thereof. Furthermore, the monitoring process 141 may monitor sensor data and determine the quality of one or a plurality of sensor data. In some embodiments, the rig computing resource environment 105 may include control processes 143 that may use the sensor data 146 to optimize drilling operations, such as, for example, the control of drilling equipment to improve drilling efficiency, equipment reliability, and the like. For example, in some embodiments acquired sensor data may be used to derive a noise cancellation scheme to improve electromagnetic and mud pulse telemetry signal processing. The control processes 143 may be implemented via, for example, a control algorithm, a computer program, firmware, or other suitable hardware and/or software. In some embodiments, the remote computing resource environment 106 may include a control process 145 that may be provided to the rig computing resource environment 105.

The rig computing resource environment 105 may include various computing resources, such as, for example, a single computer or multiple computers. In some embodiments, the rig computing resource environment 105 may include a virtual computer system and a virtual database or other virtual structure for collected data. The virtual computer system and virtual database may include one or more resource interfaces (e.g., web interfaces) that enable the submission of application programming interface (API) calls to the various resources through a request. In addition, each of the resources may include one or more resource interfaces that enable the resources to access each other (e.g., to enable a virtual computer system of the computing resource environment to store data in or retrieve data from the database or other structure for collected data).

The virtual computer system may include a collection of computing resources configured to instantiate virtual machine instances. The virtual computing system and/or computers may provide a human-machine interface through which a user may interface with the virtual computer system via the offsite user device or, in some embodiments, the onsite user device. In some embodiments, other computer systems or computer system services may be utilized in the rig computing resource environment 105, such as a computer system or computer system service that provisions computing resources on dedicated or shared computers/servers and/or other physical devices. In some embodiments, the rig computing resource environment 105 may include a single server (in a discrete hardware component or as a virtual server) or multiple servers (e.g., web servers, application servers, or other servers). The servers may be, for example, computers arranged in any physical and/or virtual configuration In some embodiments, the rig computing resource environment 105 may include a database that may be a collection of computing resources that run one or more data collections. Such data collections may be operated and managed by utilizing API calls. The data collections, such as sensor data, may be made available to other resources in the rig computing resource environment or to user devices (e.g., onsite user device 118 and/or offsite user device 120) accessing the rig computing resource environment 105. In some embodiments, the remote computing resource environment 106 may include similar computing resources to those described above, such as a single computer or multiple computers (in discrete hardware components or virtual computer systems).

Figure 3:
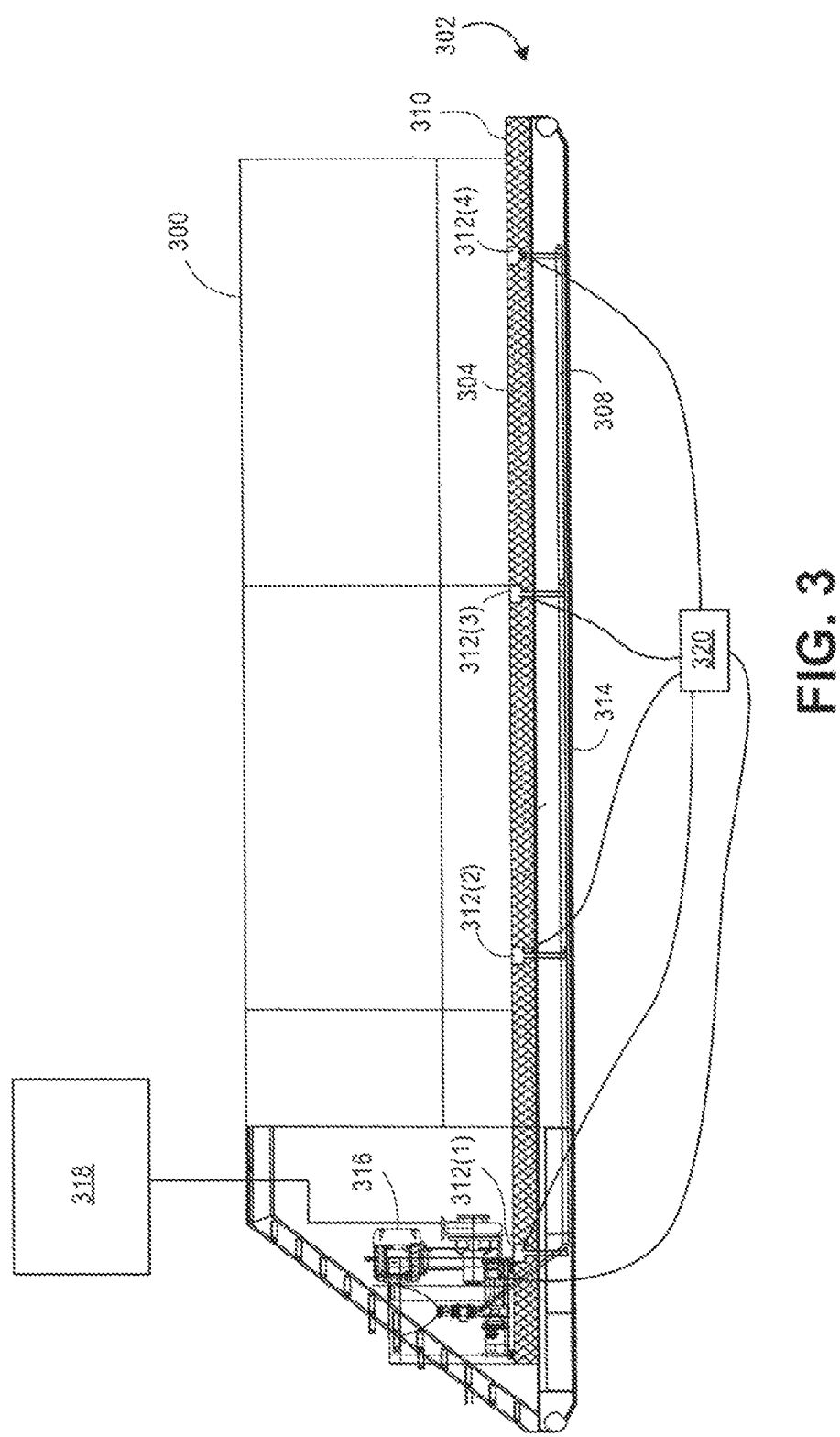
FIG. 3 illustrates a side, schematic view of a mud tank and an active fluid containment system, according to an embodiment.
Figure 4:
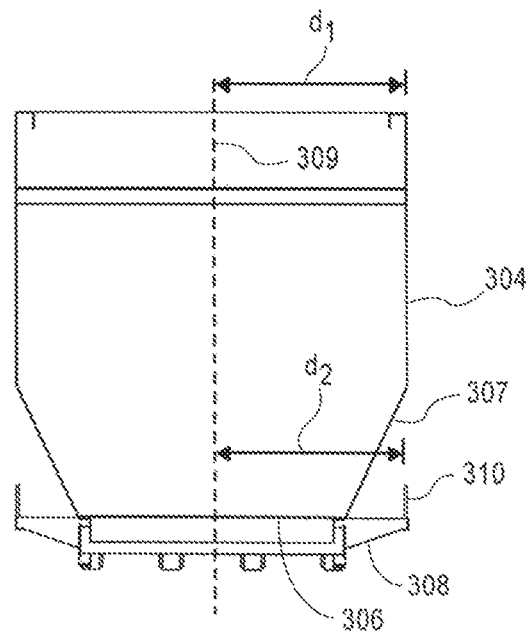
FIG. 4 illustrates an end, schematic view of the active fluid containment system, according to an embodiment.

FIG. 3 illustrates a side, schematic view of a mud tank 300 and an active fluid containment system 302 therefor, according to an embodiment. FIG. 4 illustrates an end, schematic view of the mud tank 300 and the system 302, according to an embodiment. Referring to both FIGS. 3 and 4, the mud tank 300 may be any type of mud containment vessel of any size or shape. The mud tank 300 may be coupled with a mud pump (e.g., a mud triplex), mixing devices, water and/or brine sources, etc., as may be called for to prepare a mud slurry of a desired composition and density. In an embodiment, the mud tank 300 may have a wider, upper portion 304, a narrower base 306, and a tapered wall 307 extending therebetween.

The system 302 may include a kickplate 310, which may extend along the perimeter of the mud tank 300. Further, the kickplate 310 may be positioned near the base 306. The system 302 may also include a pan 308, which may extend outward (away from a centerline 309) from the base 306 to the kickplate 310. The kickplate 310 may extend upward from the pan 308. Further, the pan 308 may extend outwards from the base 306 to a point that is vertically aligned with, or slightly closer to the centerline 309 than is the upper portion 304. In other words, the upper portion 304 may extend to a first distance $d_1$ away from the centerline 309, and the pan 308 may extend to a second distance $d_2$ from the centerline 309, with the first distance $d_1$ being the same or larger than the second distance $d_2$. Thus, the pan 308 and the kickplate 310 may reside at least partially in an overhang space created by the tapered wall 307 and the upper portion 304. As a result, the mud tank 300 itself, and more particularly, the upper portion 304, may serve to shield the pan 308, preventing or at least reducing the accumulation of rainwater or debris therein.

Referring specifically to FIG. 3, the system 302 may also include one or more float sensors (four shown: 312(1), 312(2), 312(3), 312(4)). The float sensors 312(1)-(4) may be configured to measure a fluid level in the pan 308. For example, the float sensors 312(1)-(4) may be float switches, in which a circuit may be completed when the switch floats, causing an electrical signal to be generated. In other embodiments, other types of mechanical, electrical, or electromechanical sensors may be employed to generate a signal when the fluid in the pan 308 reaches a certain level.

The system 302 may additionally include a drain line 314, which may communicate with the pan 308. Further, the drain line 314 may have several openings, e.g., uniformly-spaced in the pan 308, for collection of the fluids therein. In some embodiments, a valve may be provided to limit fluid communication from the pan 308 to the drain line 314. In some embodiments, a filter may be positioned between the pan 308 and the drain line 314. The pan 308 may be sloped toward the base 306, e.g., to direct fluids toward the drain line 314. In an embodiment, the drain line 314 may include a pipe of any suitable diameter (e.g., about 2 inches or about 5 cm).

The system 302 may further include a pump 316 that may be in fluid communication with the drain line 314. When operating, the pump 316 may pump fluid from the drain line 314 to a secondary containment vessel 318, depicted schematically in FIG. 3. The secondary containment vessel 318 may be another tank, e.g., a mobile tank that may be carried away by a truck. In other embodiments, the secondary containment vessel may be a stationary tank, which may hold the fluids for subsequent treatment and/or disposal. Further, the pump 316 may be configured to be energized in response to the signal generated by the float sensors 312(1)-(4), either directly or via a controller 320. When provided, the controller 320 may be any suitable type of programmable logic controller, computer, etc. Further, the controller 320 may be configured to receive the signal(s) from the fluid sensors 312(1)-(5) and make a determination about when the fluid in the pan 308 has reached a threshold level. The controller 320 may then respond by turning on the pump 316.

Figure 5:
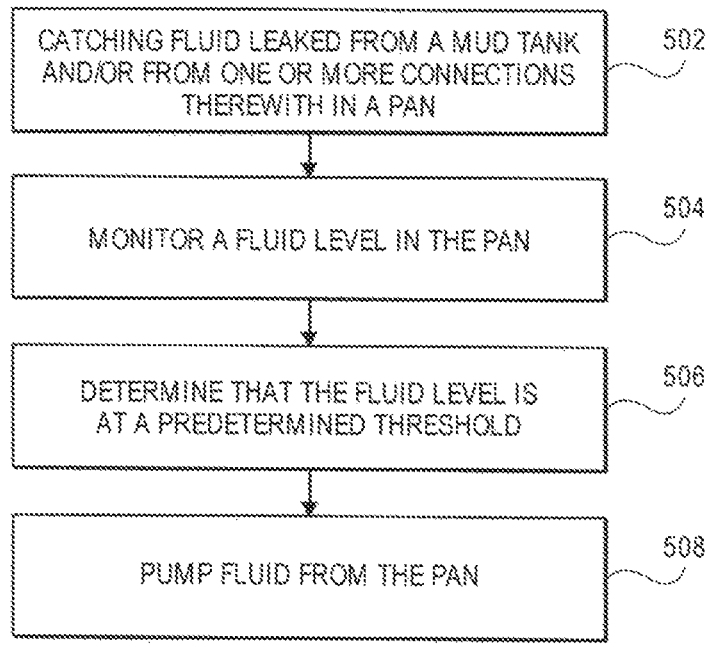
FIG. 5 illustrates a flowchart of a method for containing fluid for a mud tank, according to an embodiment.

FIG. 5 illustrates a flowchart of a method 500 for containing fluid from a mud tank, according to an embodiment. The method 500 may be executed by operating the system 302 and/or the mud tank 300, and is thus described with reference thereto. However, at least some embodiments of the method 500 may employ another system and/or fluid vessel.

The method 500 may begin by catching fluid leaked from the mud tank 300 and/or from one or more connections therewith in the pan 308, as at 502. As noted above, the kickplate 310 may extend upward from the pan 308, and the pan 308 may extend outward from a base 306 of the mud tank 300. As such, a portion (e.g., the upper portion 304) of the mud tank 300 covers or "shields" the pan 308 and reduces or prevents collection of rainwater or debris.

The method 500 may also include monitoring a fluid level in the pan 308, as at 504, e.g., using one or more fluid sensors 312(1)-(5). Monitoring at 504 may be continuous, e.g., using the fluid sensors 312(1)-(5), which may complete a circuit any time the fluid level reaches a certain level, or which may provide a frequently-updated level measurement of the fluid in the pan 308. Accordingly, "continuously" applies to a digital context with a sampling rate.

The method 500 may also include determining, e.g., using the fluid sensors 312(1)-(5) that the fluid level in the pan 308 has reached a predetermined threshold, as at 506. This determination may be made automatically, e.g., using a processor provided by the controller 320, or any other suitable computing device. In other embodiments, the determination may be made by a human in response to the fluid level, e.g., as indicated on a display.

The method 500 may also include pumping fluid, as at 506, from the pan 308 using a pump 316. The responsive pumping at 506 may be automatically initiated, but in other embodiments, may be initiated by a human operator's actions, e.g., using an input (switch, button, command, etc.). In an embodiment, the pump 316 may draw in fluid from the pan 308 via the drain line 314, which may have one or several openings in communication with the pan 308, for collecting the fluids therefrom. The fluid may be pumped to a secondary containment vessel 318, such as a tank, whether stationary or mobile, for subsequent removal, treatment, and/or disposal.

Figure 6:
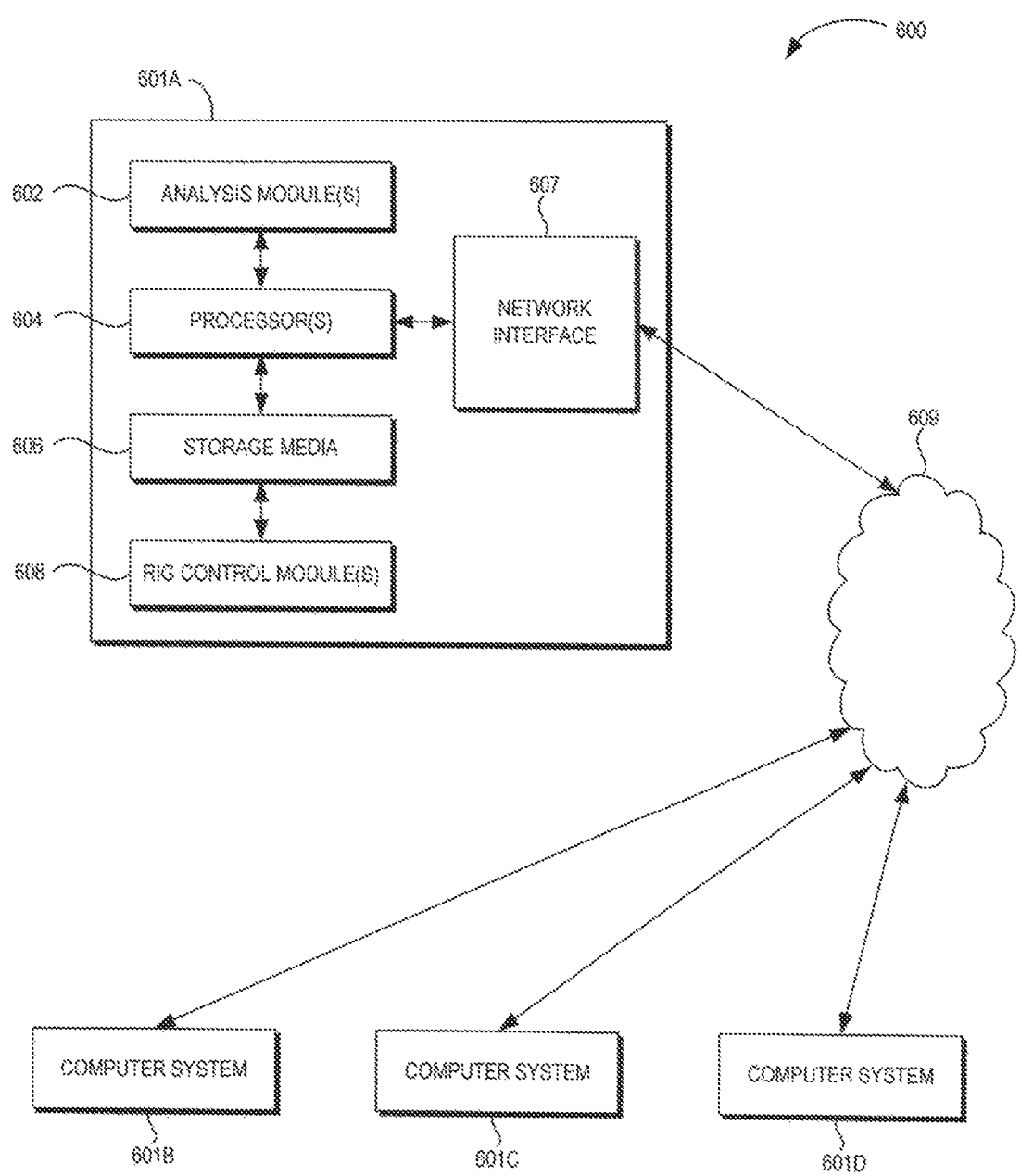
FIG. 6 illustrates a schematic view of a computing system, according to an embodiment.

In some embodiments, the methods of the present disclosure may be executed by a computing system. FIG. 6 illustrates an example of such a computing system 600, in accordance with some embodiments. The computing system 600 may include a computer or computer system 601A, which may be an individual computer system 601A or an arrangement of distributed computer systems. The computer system 601A includes one or more analysis modules 602 that are configured to perform various tasks according to some embodiments, such as one or more methods disclosed herein. To perform these various tasks, the analysis module 602 executes independently, or in coordination with, one or more processors 604, which is (or are) connected to one or more storage media 606. The processor(s) 604 is (or are) also connected to a network interface 607 to allow the computer system 601A to communicate over a data network 609 with one or more additional computer systems and/or computing systems, such as 601B, 601C, and/or 601D (note that computer systems 601B, 601C and/or 601D may or may not share the same architecture as computer system 601A, and may be located in different physical locations, e.g., computer systems 601A and 601B may be located in a processing facility, while in communication with one or more computer systems such as 601C and/or 601D that are located in one or more data centers, and/or located in varying countries on different continents).

A processor may include a microprocessor, microcontroller, processor module or subsystem, programmable integrated circuit, programmable gate array, or another control or computing device.

The storage media 606 may be implemented as one or more computer-readable or machine-readable storage media. Note that while in the example embodiment of FIG. 6 storage media 606 is depicted as within computer system 601A, in some embodiments, storage media 606 may be distributed within and/or across multiple internal and/or external enclosures of computing system 601A and/or additional computing systems. Storage media 606 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURRY® disks, or other types of optical storage, or other types of storage devices. Note that the instructions discussed above may be provided on one computer-readable or machine-readable storage medium, or alternatively, may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, the computing system 600 contains one or more mixer control module(s) 608. In the example of computing system 600, computer system 601A includes the mixer control module 608. In some embodiments, a single mixer control module may be used to perform some or all aspects of one or more embodiments of the methods disclosed herein. In alternate embodiments, a plurality of mixer control modules may be used to perform some or all aspects of methods herein.

It should be appreciated that computing system 600 is only one example of a computing system, and that computing system 600 may have more or fewer components than shown, may combine additional components not depicted in the example embodiment of FIG. 6, and/or computing system 600 may have a different configuration or arrangement of the components depicted in FIG. 6. The various components shown in FIG. 6 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to explain at least some of the principals of the disclosure and their practical applications, to thereby enable others skilled in the art to utilize the disclosed methods and systems and various embodiments with various modifications as are suited to the particular use contemplated.

What is claimed is:

1. An apparatus, comprising:
    a mud tank for containing a fluid to be deployed into a wellbore, the mud tank comprising a base and an upper portion;
    a pan extending from the mud tank, proximal to the base, such that the upper portion shields the pan, and an overhang space is open between a top of the pan and the upper portion;
    a fluid sensor coupled with the pan; and
    a pump in fluid communication with the pan, wherein the pump is configured to remove fluid from the pan when the fluid sensor indicates a predetermined threshold fluid level.

2. The apparatus of claim 1, wherein the pan extends to a first distance from a center of the mud tank, and the upper portion extends to a second distance from the center of the mud tank, the first distance being less than or equal to the second distance.

3. The apparatus of claim 1, further comprising a secondary containment vessel in fluid communication with the pump, wherein the pump pumps fluid into the secondary containment vessel.

4. The apparatus of claim 1, further comprising a controller in communication with the fluid sensor and the pump, wherein the controller is configured to receive a fluid level signal from the fluid sensor, determine that a fluid level in the pan is at least a predetermined threshold based on the fluid level signal, and energize the pump in response thereto.

5. A method for fluid containment of a mud tank, comprising:
    catching fluid leaked from the mud tank or a connection therewith in a pan extending outwardly from a base of the mud tank;
    determining, using a fluid sensor coupled with the pan, that a fluid level in the pan is at least at a predetermined threshold level; and
    in response to determining that the fluid level in the pan is at least at the predetermined threshold level, pumping the fluid from the pan,
    wherein an upper portion of the mud tank is spaced apart from and shields the pan, such that an opening to the space between the upper portion and the pan is provided around the perimeter of the pan.

* * * * *